(12) United States Patent
Mathern

(10) Patent No.: US 7,926,628 B2
(45) Date of Patent: Apr. 19, 2011

(54) SPRING-APPLIED PARKING BRAKE WITH MANUAL RELEASE AND REAPPLY

(75) Inventor: Peter David Mathern, Greenville, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 483 days.

(21) Appl. No.: 12/137,851

(22) Filed: Jun. 12, 2008

(65) Prior Publication Data

US 2009/0308700 A1    Dec. 17, 2009

(51) Int. Cl.
*F16D 65/24*    (2006.01)
(52) U.S. Cl. ........................................... 188/170
(58) Field of Classification Search ............... 188/79.57, 188/153 D, 153 R, 170, 265; 92/23, 63, 130
See application file for complete search history.

(56) References Cited

U.S. PATENT DOCUMENTS

| | | | |
|---|---|---|---|
| 4,159,754 A * | 7/1979 | Airheart et al. ............... | 188/71.8 |
| 4,192,405 A | 3/1980 | Lee et al. | |
| 4,279,332 A | 7/1981 | Morgan et al. | |
| 4,304,322 A * | 12/1981 | Beccaris .................. | 192/111.12 |
| 4,361,078 A | 11/1982 | Cape et al. | |
| 4,364,305 A | 12/1982 | Dalibout et al. | |
| 4,472,995 A | 9/1984 | Persson | |
| 4,480,531 A | 11/1984 | Mylius et al. | |
| 4,493,246 A | 1/1985 | Dalibout | |
| 4,552,056 A | 11/1985 | McKay | |
| 4,564,088 A | 1/1986 | Takahashi et al. | |
| 4,649,804 A | 3/1987 | Oberlander | |
| 4,785,718 A | 11/1988 | Hata et al. | |
| 4,793,449 A | 12/1988 | Smith | |
| 4,799,400 A * | 1/1989 | Pickell ......................... | 74/502.6 |
| 4,833,975 A | 5/1989 | Rocholl et al. | |
| 4,865,166 A | 9/1989 | Rocholl et al. | |
| 4,957,193 A | 9/1990 | Tamamori | |
| 5,020,418 A | 6/1991 | Sendoykas | |
| 5,154,491 A | 10/1992 | Graham | |
| 5,423,401 A | 6/1995 | Noah et al. | |
| 5,634,534 A * | 6/1997 | Kanai et al. ..................... | 188/67 |
| 5,636,562 A | 6/1997 | Choinski et al. | |
| 5,640,893 A | 6/1997 | Stojic | |
| 5,816,371 A | 10/1998 | Buckley et al. | |
| 5,848,550 A | 12/1998 | Cathcart et al. | |
| 5,937,974 A | 8/1999 | Cathcart et al. | |
| 6,006,651 A | 12/1999 | Pierce et al. | |
| 6,378,668 B1 | 4/2002 | Zemyan et al. | |
| 6,386,339 B1 | 5/2002 | Woollams | |
| 6,397,986 B2 | 6/2002 | Moore | |

(Continued)

FOREIGN PATENT DOCUMENTS

CA    1271794 A    7/1990

(Continued)

*Primary Examiner* — Bradley T King
*Assistant Examiner* — Stephen Bowes
(74) *Attorney, Agent, or Firm* — The Webb Law Firm

(57) ABSTRACT

A spring-applied parking brake with manual release and reapply. A gear box fixed relative to the rear wall of a cylinder has a manual crank. A pushrod extending through the cylinder and gear box is connected to provide braking force. A threaded collet surrounding helical threads on the pushrod has flexible radially expandable tines. When the gear box is manually cranked, the pushrod is rotated and due to interaction of the threads on the inside of the collet and on the pushrod, the pushrod is moved axially releasing or reapplying the brake.

5 Claims, 1 Drawing Sheet

U.S. PATENT DOCUMENTS

| | | |
|---|---|---|
| 6,702,072 B2 | 3/2004 | Asano |
| 6,725,975 B2 | 4/2004 | Chapman |
| 6,761,253 B1 | 7/2004 | Kanjo et al. |
| 6,799,502 B2 | 10/2004 | Wolfsteiner et al. |
| 2001/0042660 A1 | 11/2001 | Moore |

FOREIGN PATENT DOCUMENTS

| | | |
|---|---|---|
| DE | 3730808 A1 * | 3/1989 |
| EP | 0490841 A1 | 6/1992 |
| WO | 9720153 A1 | 6/1997 |

* cited by examiner

SPRING-APPLIED PARKING BRAKE WITH MANUAL RELEASE AND REAPPLY

BACKGROUND OF THE INVENTION

1. Field of the Invention

This invention relates to spring-applied parking brakes for transit vehicles which normally are released by use of pneumatic pressure. It further involves the manual release and reapplication of the brake, for example, when pneumatic pressure is not available.

2. Description of Related Art

Service brakes for transit vehicles are normally applied by pneumatic cylinders supplied with the pressurized air by the lead vehicle or engine. When vehicles are separated from the lead vehicle, parking brakes are desirable to prevent runaway motion. Typically, the parking brakes are spring applied. Pushrods connected to spring actuated pistons connect with linkages effecting service braking. The spring-applied brakes can be released by pneumatic pressure once the vehicle is reconnected to a lead vehicle or source of air pressure. In some prior art spring-applied brakes, a manual release is provided for disconnecting the piston from the pushrod, thus permitting movement of the vehicle. This spring-applied brake cannot be reactivated until pneumatic pressure is again available. See U.S. Pat. No. 5,848,550 entitled "Parking Brake Manual Release Mechanism." The brake disclosed therein includes a collet connection between the piston and pushrod for effecting slack adjustment in the service brake mode. In other prior art, the application and release of the parking brake force is effected with either air pressure or with a mechanical winding action. In this case, the connection between the spring driven piston and the pushrod is controlled by a nut threaded on the pushrod, the rotation of which is secured by a pneumatically controlled clutch. During parking brake application, the nut is prevented from rotating with a toothed clutch which is released when air pressure is reapplied to reset the brake unit.

SUMMARY OF THE INVENTION

Briefly, according to one embodiment of this invention, there is provided a spring-applied parking brake with manual release and reapply comprising a pneumatic cylinder having a cylinder wall and front and rear walls, a piston sealed relative to the cylinder wall, a parking brake spring extending between the piston and rear wall for biasing the piston to the front wall, and a pneumatic pressure inlet for applying pressure to move the piston against the spring to the rear wall. A gear box is fixed relative to the rear wall. The gear box has a manual crank. A pushrod extends through the cylinder, front and back walls, piston, and gear box. The pushrod is connectable at one end for providing braking force when in a position extending outward from the front wall. The pushrod has a key secured on the other end extending through the gear box. The pushrod has helical threads on a central portion extending through the piston. A threaded collet surrounding the helical threads has flexible radially expandable tines. The collet is captured by the piston and secured from rotation relative to the piston. Thus, when the gear box is manually cranked, the pushrod is rotated and due to the threads on the inside of the collet, the pushrod is moved axially relative to the piston depending on the direction of the cranking of the gear box. When pneumatic pressure is reapplied to the cylinder to move it against the parking brake spring, the collet tines can expand and release to permit the pushrod to move to a reset position relative to the piston.

Preferably, the spring-applied parking brake further comprises a tube arranged radially outward of and coaxial with the pushrod and being secured at one axial end to the piston. An annular collet stop is secured at the other axial end of the tube. The collet is positioned radially between the pushrod and the tube. When the parking brake spring carries the piston to the front end wall, the collet stop bears upon the collet. The collet then grips the pushrod to carry it along with the piston. The collet and collet stop have complementary conical surfaces that cause the collet stop to squeeze the collet onto the pushrod when the parking brake spring moves the piston. Pins extend radially through the tines and are secured in the tube allowing expansion of the tines and preventing relative rotation between the collet and the tube (and piston).

BRIEF DESCRIPTION OF THE DRAWING

Further features and other objects and advantages will become apparent from the following detailed description made with reference to the drawing in which:

The drawing is a schematic section through a spring-actuated parking brake according to this invention.

DESCRIPTION OF THE PREFERRED EMBODIMENTS

Figure 1:
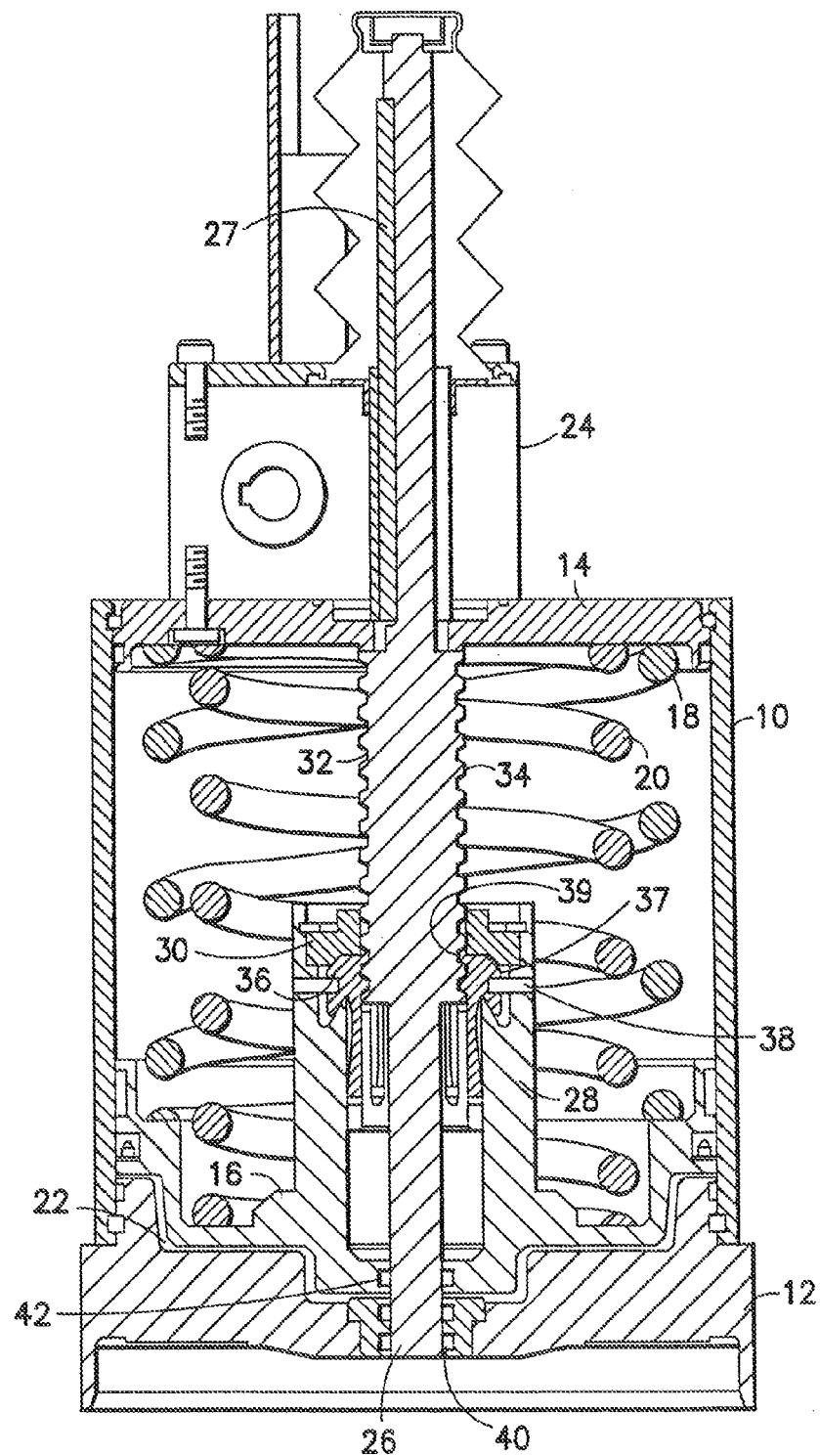

Referring now to the drawing, the spring-applied parking brake according to one embodiment of this invention is schematically illustrated. The parking brake comprises a cylinder 10 with an annular front wall 12 secured at one end and an annular back wall 14 secured at the other end. A piston 16 is positioned within the cylinder and is sealed to the interior cylinder wall, for example, by an O-ring captured in an annular groove. Concentric springs 18, 20 are positioned between the back wall and the piston to bias the piston towards the front wall. An opening 22 is provided into the space between the front wall and the piston for placing the space in communication with pressurized air. A gearbox 24 is secured to the back wall. The gearbox provides for application of the winding action perpendicular to the pushrod to be next described. The gearbox allows for higher or lower winding speed and torque based on the ratio of the gearbox.

A pushrod 26 is axially positioned within the cylinder, the front and back wall, the gear box and the piston. Axial motion of the piston in the direction of the front wall applies a braking force via a linkage with the service brake mechanism (not shown). The pushrod extends out of the bottom of the unit as illustrated in the drawing.

Extending from the piston is a coaxial tube 28 which has an annular collet stop 30 secured to the end opposite of the piston. The pushrod 26 has a key or rack 27 secured to the end passing through the gear box. The pushrod has a larger diameter threaded central section 32 with helical threads 34 on the outer diameter thereof.

A collet 36 is positioned between the coaxial tube 28 and the threaded central portion 32 of the pushrod. The collet has flexible tines 37 that allow expansion for overriding the threads 34 on the pushrod. The collet 36 has internal threads 39.

The collet stop 30 has an interior conical surface and the collet tines together have an exterior conical surface.

Where the pushrod 26 passes through the front wall 12, seals 40 are provided. Also, where the pushrod passes through the piston 16, a seal 42 is provided.

The drawing shows the spring-operated parking brake at the time the spring has moved the piston to the front wall and the pushrod has been manually withdrawn to release the brake. Note that the enlarged diameter threaded section of the pushrod has moved entirely to the back wall. When pressurized air is applied to the piston, it will carry the piston toward the back wall and, at this time, the collet tines will spread and the piston will slide over the pushrod until the enlarged diameter section contacts the piston. Should the air pressure be removed, the springs will carry the piston back to the front wall. As soon as the springs begin to move the piston, the collet will reset and grip the pushrod so that the pushrod will be carried forward with the piston setting the brakes. Once the brakes have been set by the action of the springs and pneumatic pressure is no longer available, the brake cannot be pneumatically released and must be released manually. When the parking brake is released by manual cranking, the piston moves to the front wall, and the pushrod retracts toward the back wall/end by the interaction of the threads on the enlarged diameter section of the pushrod and the threads on the inside of the collet. At this time, the collet is being drawn into the collet stop keeping the collet threads engaged with the threads on the pushrod. If it is desired to reapply the brake manually, cranking can be reversed. The collet will remain engaged with the pushrod due to the pressure applied to the piston by the springs.

Having thus defined my invention with the detail and particularity required by the Patent Laws, what is desired protected by Letters Patent is set forth in the following claims.

The invention claimed is:

1. A spring-applied parking brake with manual release and reapply comprises:
    a pneumatic cylinder having a cylinder wall and front and rear walls;
    a piston sealed relative to the cylinder wall;
    a parking brake spring or springs extending between the piston and rear wall for biasing the piston to the front wall;
    a gear box fixed relative to the rear wall, said gear box having a manual crank;
    a pushrod extending through the cylinder, front and back walls, piston and gear box for being connected to provide braking force when in a position extending outward from the front wall, said pushrod having a key or rack on the end thereof extending through the gear box and helical threads on a portion through the piston;
    a threaded collet surrounding the helical threads having flexible radially expandable tines, said collet captured by the piston and secured from rotation relative to the piston; and
    such that when the gear box is manually cranked, the pushrod is rotated and due to the threads on the inside of the collet, the pushrod is moved axially relative to the piston and, such that when pneumatic pressure is applied to the cylinder to move it against the parking brake spring, the collet tines can expand and release to permit the pushrod to move to a reset position relative to the piston.

2. The spring-applied parking brake according to claim 1, further comprising a tube arranged radially outward of and coaxial with the pushrod and being secured at one axial end to the piston and a collet stop being secured at the other axial end of the tube, the collet being positioned radially between the pushrod and the tube, such that when the parking brake spring carries the piston to the front end wall, the collet stop bears upon the collet which then grips the pushrod to carry it along with the piston.

3. The spring-applied parking brake according to claim 2, wherein the collet and collet stop have complementary conical surfaces that cause the collet stop to squeeze the collet onto the pushrod when the parking brake spring moves the piston.

4. The spring-applied parking brake according to claim 2, further comprising pins extending radially through the tines and secured in the tube allowing expansion of the tines and preventing relative rotation between the collet and the tube and piston.

5. The spring-applied parking brake according to claim 1, wherein the pushrod has sliding seals between the rod surface and the piston and front wall.

* * * * *